United States Patent [19]

Ogata et al.

[11] Patent Number: 5,189,655
[45] Date of Patent: Feb. 23, 1993

[54] OPTICAL HEAD FOR OPTICAL DISK RECORDING/REPRODUCING APPARATUS INCLUDING MODIFIED WOLLASTON PRISM

[75] Inventors: Nobuo Ogata, Tenri; Tetsuo Ueyama; Yoshihiro Sekimoto, both of Nara; Toshiyuki Tanaka, Moriguchi; Hideaki Sato, Yamato-Koriyama, all of Japan

[73] Assignee: Sharp Kabushiki Kaisha, Osaka, Japan

[21] Appl. No.: 580,830

[22] Filed: Sep. 11, 1990

[30] Foreign Application Priority Data

Sep. 14, 1989 [JP] Japan .................................. 1-239009

[51] Int. Cl.$^5$ .............................................. G11B 7/095
[52] U.S. Cl. .................................. 369/44.23; 369/54; 369/110; 369/112; 369/116; 369/120
[58] Field of Search ............... 369/13, 44.12, 44.14, 369/109–112, 120, 44.23, 54, 55, 116

[56] References Cited

U.S. PATENT DOCUMENTS

| | | | |
|---|---|---|---|
| 4,729,122 | 3/1988 | Itoh | 369/13 |
| 4,771,414 | 9/1988 | Yoshimatsu | 369/110 |
| 4,773,053 | 9/1988 | Gottfried | 369/110 X |
| 4,951,274 | 8/1990 | Iwanaga et al. | 369/110 X |
| 5,070,494 | 12/1991 | Emoto et al. | 369/112 |
| 5,097,462 | 3/1992 | Fujita et al. | 369/109 |

FOREIGN PATENT DOCUMENTS

| | | |
|---|---|---|
| 0255305 | 2/1988 | European Pat. Off. |
| 0270874 | 6/1988 | European Pat. Off. |
| 3802538 | 8/1988 | Fed. Rep. of Germany |
| 63-113503 | 5/1988 | Japan |
| 63-187440 | 8/1988 | Japan |
| 63-269323 | 11/1988 | Japan |
| 64-60840 | 3/1989 | Japan |

OTHER PUBLICATIONS

Patents Abstracts of Japan, vol. 9, No. 314, (P-412) [2037], Dec. 1985, & JP-60143453.
Patent Abstracts of Japan, vol. 10, No. 116, (P452)[2173], Apr. 1986, JP 60246034.

Primary Examiner—Wayne R. Young
Attorney, Agent, or Firm—David G. Conlin; Robert F. O'Connell

[57] ABSTRACT

An optical head, for an optical disk recording/reproducing apparatus, for irradiating a recording medium by a light beam emitted from a light source and introducing an information light formed by a light beam reflected from the recording medium to a photo detector, a shift of an optical axis of the information light being minimized. The optical head includes a unit for receiving the information light which is reflected from the recording medium, a first reflecting unit for reflecting such information light, a second reflecting unit for reflecting the information light reflected by the first reflecting unit and for directing the reflected information light toward the photo detecting system, and a unit for emerging the information light reflected by the second reflecting unit to the photo detecting system. The first reflecting unit has a surface for reflecting the information light thereby, and the second reflecting unit also has a surface for reflecting the reflected information light from the surface of the first reflecting unit. The surface of the first reflecting unit is substantially parallel to the surface of the second reflecting unit. The emerging surface has a surface from which the information light reflected by the surface of the second reflecting unit emerges. An angle between the surface of the receiving unit and the surface of the first reflecting unit is substantially equal to an angle between the surface of the second reflecting unit and the surface of the emerging unit.

8 Claims, 10 Drawing Sheets

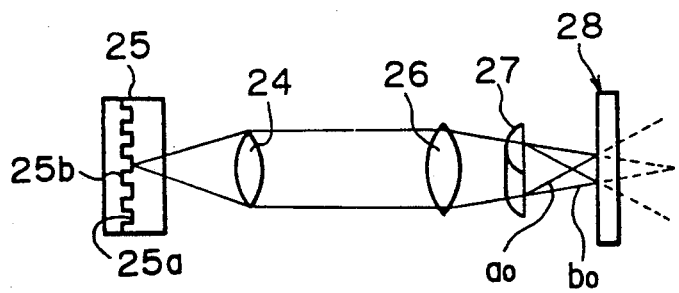
Fig. 3 PRIOR ART
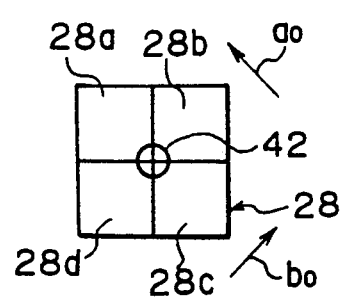
Fig. 4 PRIOR ART
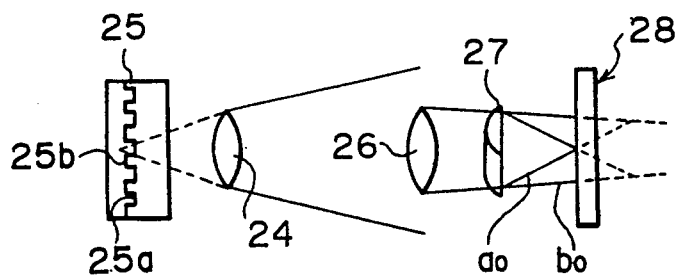
Fig. 5 PRIOR ART
Fig. 6 PRIOR ART
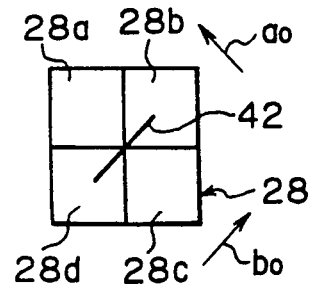
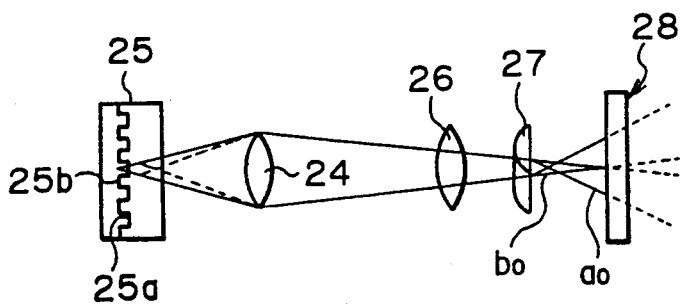
Fig. 7 PRIOR ART
Fig. 8 PRIOR ART
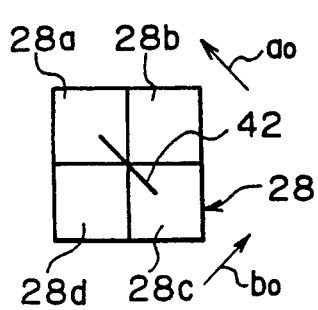

SERVO ERROR SIGNAL DETECTION OPTICAL SYSTEM

SERVO ERROR SIGNAL DETECTION OPTICAL SYSTEM

OPTICAL HEAD FOR OPTICAL DISK RECORDING/REPRODUCING APPARATUS INCLUDING MODIFIED WOLLASTON PRISM

BACKGROUND OF THE INVENTION

1. Field of the Invention

The present invention relates to an optical head for an optical disk recording/reproducing apparatus, the optical head converging a beam of light emitted from a light source and irradiating the converged beam of light onto a recording medium, as well as guiding information light reflected by the recording medium into a photo detector.

2. Description of the Related Art

The inventors of the present invention know an optical disk recording/reproducing apparatus which converges a beam of light onto a recording medium formed on an optical disk and thereby records data on and reproduces the data from the optical disk. Particularly, the above-mentioned optical disk recording/reproducing apparatus employs an optical magnetic disk, because the optical magnetic disk is a high-density memory device with a large-capacity and capable of storing data erasably.

When data is recorded on an optical magnetic disk, a beam of light emitted from a semiconductor laser is focused and irradiated onto a recording medium in the form of a beam spot to raise the temperature of the area of the recording medium irradiated by the beam spot to the Curie point or above. The area of the recording medium whose temperature is high loses a coercive force and is magnetized in the direction parallel to the direction of an external magnetic field applied thereto. Thereafter, the irradiation of the light beam is suspended while an application of the external magnetic field continues. As a result, the temperature of the area irradiated by the beam spot is lowered below a temperature of the Curie point, and the area remains to be magnetized in the above-described direction, thereby the data is recorded.

When the data is reproduced from the optical magnetic disk, a beam of light is emitted at a level low enough not to heat the recording medium to a temperature higher than the Curie point, and this beam of light is focused on the recording medium. At that time, Kerr effect (magneto-optical effect) occurs on the beam of light focused on the recording medium and the plane of polarization of the light is thus rotated through an angle depending upon the direction in which the irradiated area is magnetized. Thus, the data can be reproduced by detecting the direction in which the irradiated area is magnetized from the direction in which the plane of polarization is rotated.

On the optical magnetic disk, information tracks and guide tracks are alternately formed in a concentric or spiral fashion with spaces of about 1.6 $\mu$m. The data can be recorded on and reproduced from a desired position on the optical magnetic disk by utilizing the guide track. In order to achieve accurate data recording and reproducing, the beam of light must be controlled such that it is focused on the recording medium and follows the guide track, i.e., focusing control and tracking control must be performed. Hence, the optical head detects a focusing error signal and a tracking error signal, and drives an objective through an objective actuator in the focusing and tracking directions on the basis of the detected servo error signals.

FIG. 1 shows one example of the above-mentioned optical head. In this optical head, linearly polarized rays of light emitted from a semiconductor laser 21 are converted into a beam made up of parallel rays of light by a collimator 22, and the resulting beam passes through a polarization beam splitter 23. Thereafter, the beam is focused and irradiated by an objective 24 on a recording surface 25 of a recording medium in the form of a beam spot. When the rays of light are reflected by the recording surface 25 of the recording medium, they are modulated such that the plane of polarization thereof is rotated through an angle depending on the direction in which the area irradiated by the beam spot is magnetized and becomes information light. The modulated information light passes through the objective 24 again and is made incident on the polarization beam splitter 23 from a surface 23a thereof. The incident light is reflected by a splitting surface 23b and then propagates in a direction indicated by a1.

The information light which propagates in the direction a1 is split into two components by a splitting surface 23c. The information light which is directed in a direction indicated by b1 emerges from a surface 23d and then reaches a servo error signal detection optical system which consists of a condenser 26, a cylindrical lens 27 and a photo detector 28. The servo error signal detection optical system respectively detects a focusing error signal and a tracking error signal by the astigmatism method and the push-pull method from the information light which passes through the optical system.

The information light which is directed in a direction indicated by b2 emerges from the beam splitter 23 through a surface 23d' thereof and is then demodulated by a read signal detection optical system which consists of a halfwave plate 29, a condenser 30, a polarization beam splitter (polarizer) 21, and a pair of photo detectors 32 and 33. The read signal detection optical system includes the pair of photo detectors so that the noises having the same phase can be cancelled by operating the differential output of these photo detectors and a read signal having a high quality can thus be obtained.

However, since the optical head of the abovedescribed type contains two detection optical systems, that is, the servo error signal detection optical system and the read signal detection optical system, it requires a large number of optical components and thus have a complicated structure.

This problem of the above-mentioned optical heads has been solved by an optical head which is disclosed in Japanese Patent Application Laying Open No. 63-187440 and which utilizes a modified Wollaston prism disclosed in Japanese Patent Application Laying Open No. 63-113503 to simplify the configuration.

In the above-mentioned optical head, the rays of light emitted from the semiconductor laser 21 pass through the same path and are focused onto the recording surface 25 of the recording medium, as shown in FIG. 2. The information light reflected by the recording surface 25 of the recording medium emerges from the beam splitter 23 through the surface 23c and is then made incident on a modified Wollaston prism (analyzer) 34.

The modified Wollaston prism 34 splits the incident rays of light into three components. One of the three components is a central beam whose intensity remains the same as that of the incident light, and two of the three components are a left beam and a right beam, of which each intensity is varied in accordance with the polarized state of the incident light.

The photo detector 28 consists of six elements in which four elements correspond to the central beam while two elements correspond to the right and left beams, respectively. The three beams emerging from the Wollaston prism 34 are transformed into rays of beam exhibiting astigmatism by the passing through the condenser 26 and the cylindrical lens 27. A servo error signal is detected from the output of the four elements corresponding to the central beam, and a read signal is detected by operating the differential output of the remaining two elements.

Thus, in the above-described type of optical head, the single optical system can be used as both the servo error signal detection optical system and the read signal detection optical system, and the photo detector can be constructed by one component which has six elements. In consequence, the optical system can be simplified.

Now a principle of detecting the servo error signals will be explained. FIGS. 3 to 8 show, in a simplified fashion, the optical path from the recording surface 25 of the recording medium to the servo error detection optical system.

The rays of light emitted from the semiconductor laser (not shown) are focused by the objective 24 on the recording surface 25 of the recording medium in the form of a beam spot. When the light is reflected by the recording surface 25 of the recording medium, it possesses information, and the light having information passes through the objective 24, the condenser 26 and the cylindrical lens 27 in that order and thereby exhibits astigmatism. This light is received by the light detector 28 having four light receiving portions 28a, 28b, 28c and 28d which are divided by the two boundary lines inclined by 45° relative to the generatrix of the cylindrical lens 27. Let the intensities of light received by the light receiving portions 28a, 28b, 28c and 28d be Sa, Sb, Sc and Sd respectively, then the focusing error signal (FES) is given by $FES=(Sa+Sc)-(Sb+Sd)$, and the tracking error signal (TES) is given by $TES=(Sa+Sb)-(Sc+Sd)$.

When the beam of light is in focus on the recording medium, a beam spot 42 formed on the photo detector 28 is circular, as shown in FIG. 4. In consequence, the intensities Sa, Sb, Sc and Sd of the light received by the four light receiving portions 28a, 28b, 28c, and 28d are the same, i.e., FES=0.

When the distance between the recording surface 25 of the recording medium and the objective 24 is too short, as shown in FIG. 5, the photo detector 28 detects a beam spot 42 which is elongated in a direction b0 which is parallel to the generatrix of the cylindrical lens 27, as shown in FIG. 6. In consequence, FES <0.

When the distance between the recording surface 25 of the recording medium and the objective 24 is too long, as shown in FIG. 7, the photo detector 28 detects an elliptical beam spot 42 which is elongated in a direction a0 which is perpendicular to the generatrix of the cylindrical lens 27, as shown in FIG. 8. In consequence, FES>0.

Thus, it is possible to determine whether the distance between the recording surface 25 of the recording medium and the objective 24 is appropriate, too long or too short by using the sign of the value of the focusing error signal. This type of focusing error signal detection method is called the astigmatism method.

The beam spot formed on the photo detector 28 has a shadow portion 43 (hereinafter referred to as a diffraction pattern) due to a diffraction caused by an information track 25a, as shown in FIGS. 9 to 14.

This diffraction pattern 43 occurs even when the beam of light is in focus, as shown in FIGS. 3 and 4. The diffraction pattern 43 varies, as shown in FIGS. 10, 12 and 14, in accordance with a shift in the positional relation between a beam spot 41 formed on the recording surface 25 of the recording medium and the information track 25a, a guide track 25b, as shown in FIGS. 9, 11 and 13 respectively.

When the beam spot 41 is at the center of the information track 25a, as shown in FIG. 11, the corresponding diffraction pattern 43 is symmetrical with respect to the line X—X which separates the light receiving portions 28a and 28b from the light receiving portions 28d and 28c, as shown in FIG. 12. In consequence, TES=0. However, when the beam spot 41 deviates from the center of the information track 25a, the corresponding diffraction pattern 43 shows asymmetry. In consequence, TES≠0.

Thus, it is possible to determine whether or not the positional relation between the beam spot formed on the recording surface 25a of the recording medium and the information track 25a is appropriate from the sign of the value of the tracking error signal, and if the positional relation is not appropriate, a deviational direction of the beam spot 41 can be determined from the sign of the value of the tracking error signal as well. This type of stracking error signal detection method is called the push-pull method.

In the above-described optical head which employs the modified Wollaston prism, or in the optical head which does not use the modified Wollaston prism, the polarization beam splitter 23 is mounted on a housing in a state in which it is elastically supported by a spring or in which it is fixed by an adhesive.

Although mounting of the polarization beam splitter 23 may be performed highly and precisely at the stage of manufacture of the optical head, a position or an angle at which the polarization beam splitter 23 is mounted may change with time due to the changes in the temperature or various other factors associated with the mounting precision of the polarization beam splitter 23.

When the polarization beam splitter 23 is displaced from its original position indicated by a solid line in FIG. 15 (where the offset of the servo error signal is zero) to a position which is separated from the original position by Δd and which is indicated by a virtual line, as shown in FIG. 15, the optical axis of the rays of light propagating toward the servo error signal detection optical system is displaced by Δd, as shown by the virtual line.

When the polarization beam splitter 23 is inclined by an angle Δθ, as shown in FIG. 16, the optical axis of the rays of light which are directed toward the servo error signal detection optical system inclines at an angle 2Δθ which is twice the angle Δθ, as shown by the virtual line. As a result, the beam spot formed on the photo detector 28 deviates, and a great offset occurs in the servo error signal, thereby the accurate recording and reproducing of the data become difficult to be performed.

SUMMARY OF THE INVENTION

It is therefore, an object of the present invention to provide an optical head capable of minimizing a shift in the optical axis of the rays of light directed toward a servo error signal detection optical system even at a time when a position or an angle of a light split unit is changed with a time due to the changes in the temperature or the various other factors.

An object of the present invention can be achieved by an optical head for an optical disk recording/reproducing apparatus, which is capable of irradiating a recording medium by a light beam emitted from a light source and introducing an information light which is formed by the light beam reflected from the recording medium to a photo detecting system with minimizing a shift of an optical axis of the information light, the optical head includes a unit for receiving the information light which is reflected from the recording medium, a first reflecting unit for reflecting the information light received by the receiving unit, a second reflecting unit for reflecting the information light reflected by the first reflecting unit and for directing the reflected information light toward the photo detecting system, and a unit for emerging the information light reflected by the second reflecting unit to the photo detecting system.

Preferably, the first reflecting unit has a surface for reflecting the information light thereby, and the second reflecting unit also has a surface for reflecting the reflected information light from the surface of the first reflecting unit, the surface of the first reflecting unit being substantially parallel to the surface of the second reflecting unit.

More preferably, the emerging surface has a surface for emerging the information light reflected by the surface of the second reflecting unit, and an angle between the surface of the receiving unit and the surface of the first reflecting unit substantially being coincided with an angle between the surface of the second reflecting unit and the surface of the emerging unit.

The receiving unit, the first reflecting unit, the second reflecting unit and the emerging unit constitutes a light split unit, preferably.

More preferably, the beam split unit further includes a beam incident unit disposed adjacent to the first reflecting unit for shaping a beam of the light incident on a surface thereof.

Further preferably, a modified Wollaston prism is disposed on the surface of the emerging unit for splitting the information light emerged from the emerging unit.

The modified Wollaston prism preferably splits the information light emerged from the emerging unit into three components.

The three components are a central beam whose intensity is the same as that of the incident light received by the receiving unit, a left and a right beams each of whose intensities is varied in accordance with a polarized state of the incident light, preferably.

Preferably, a modified Wollaston prism is disposed between the first reflecting unit and the second reflecting unit for splitting the information light emerged from the emerging unit.

The optical head further includes a photo detector for monitoring an intensity of the light emitted from the light source and incident on the beam incident unit, preferably.

Furthermore, preferably, the photo detecting system consists of a condense lens, a cylindrical lens, and a photo detector in series for detecting a focusing error signal by an astigmatism and a tracking error signal by a push-pull from a light passing therethrough.

Preferably, the optical head further includes a signal detecting system consisting of a halfwave length plate, a condense lens, a polarizer, and a pair of photo detectors, in series for obtaining a high quality of a read signal.

Moreover, the light reflected from the recording medium is polarized thereby.

The light splitting unit is a polarization beam splitter.

The information light is so formed that a plane of polarization thereof is rotated in a direction corresponding to a direction in which an area of a surface of the recording medium irradiated by a spot of the beam light is magnetized, preferably.

According to the present invention, even at a time when the position of the light split unit shifts, the optical axis of the information light which leave the light split unit from an information light emerging surface thereof coincides with that of incident light. Also, even at a time when the angle of the light split unit shifts, the optical axis of the information light which leave the light split unit from an information light emerging surface thereof does not separate from the optical axis of the incident light greatly although offset occurs more or less. In consequence, displacement of the optical axis of the information light which are directed toward the servo error signal detection optical system can be minimized.

As a result, even at a time when the position or the angle of the light split unit changes with a time due to the changes in the temperature or other various factors, a displacement of the optical axis of the information light propagating toward the servo error signal detection optical system can be minimized.

In one preferred form of the present invention, a modified Wollaston prism is integrally formed between first and second information light reflecting surfaces. In consequence, the overall size of the optical head can be reduced.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 3 to 8 illustrate the principle of the focusing error signal detection by the astigmatism;

DESCRIPTION OF THE PREFERRED EMBODIMENTS

A first embodiment of the present invention will be described with reference to FIGS. 17 to 19.

The first embodiment relates to an optical head which does not employ a modified Wollaston prism.

Figure 1:
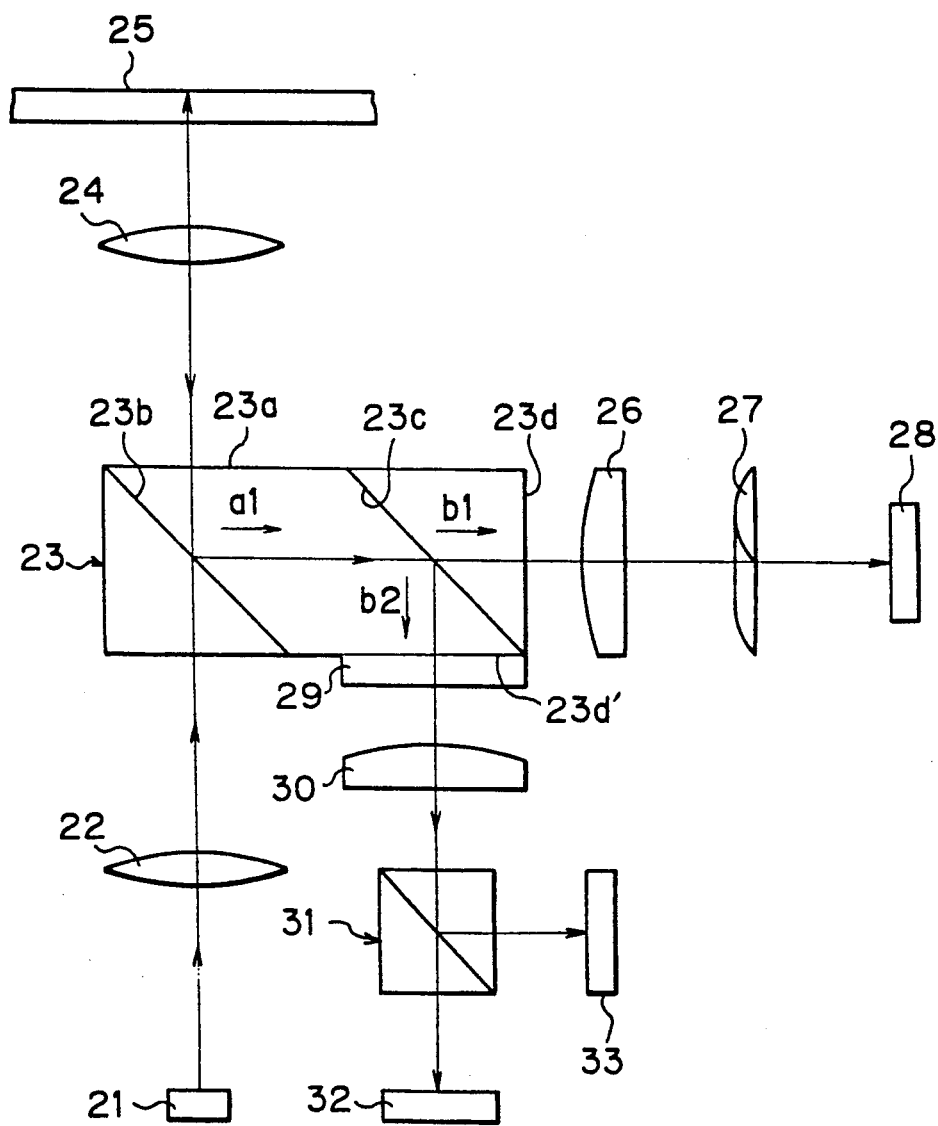
FIGS. 1 and 2 respectively show a known optical head.
Figure 2:
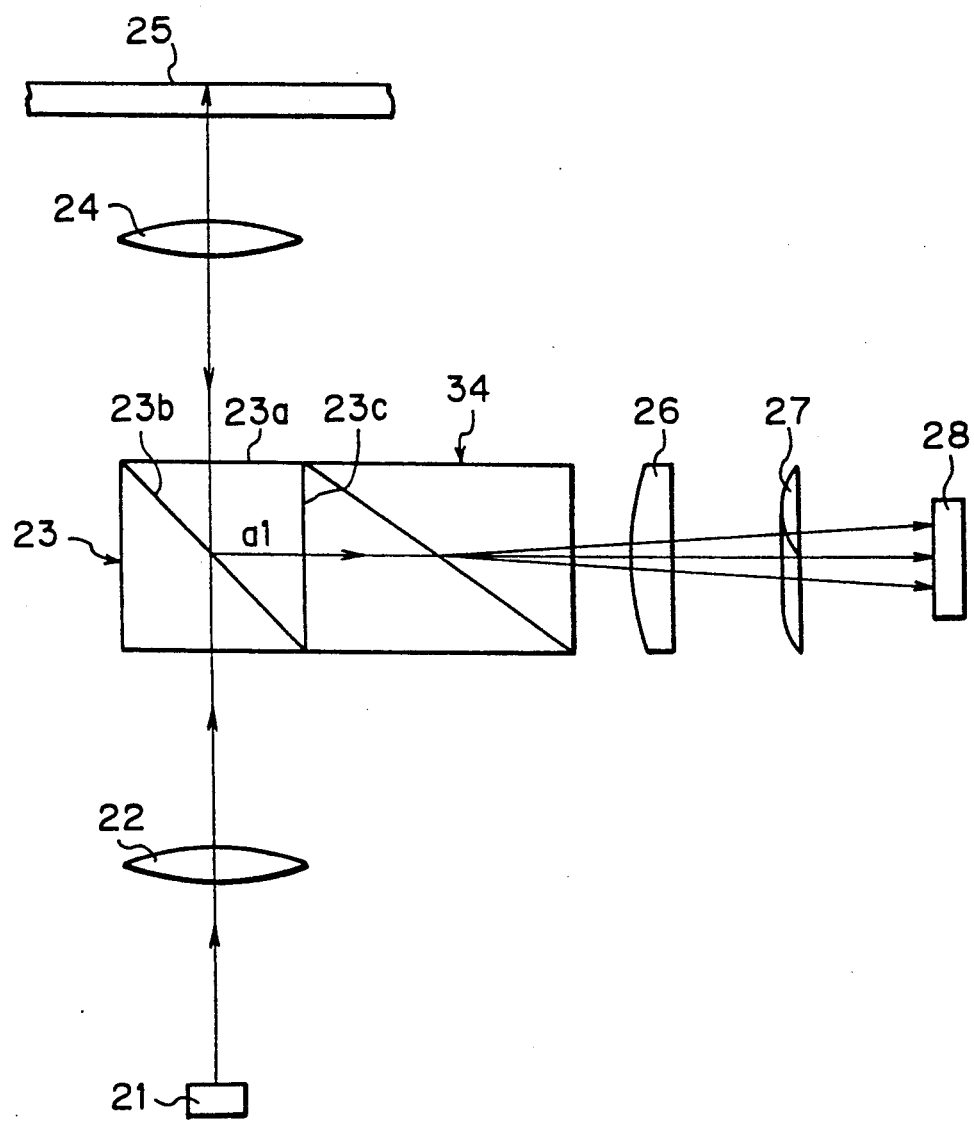
Figure 9:
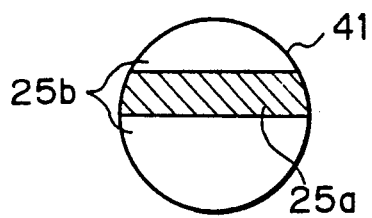
FIGS. 9 to 14 illustrate the principle of the tracking error signal detection by the push-pull method.
Figure 10:
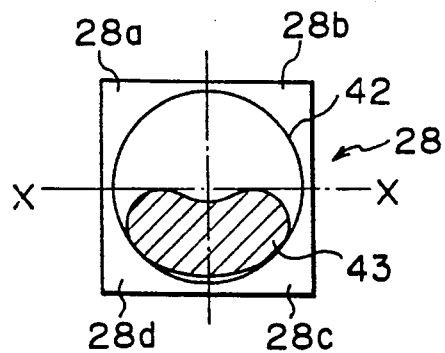
Figure 11:
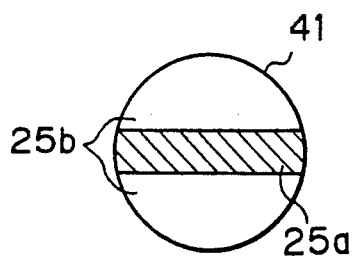
Figure 12:
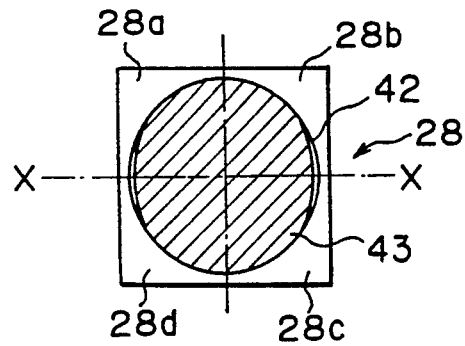
Figure 13:
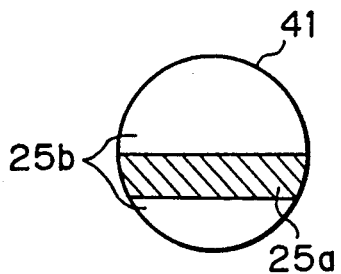
Figure 14:
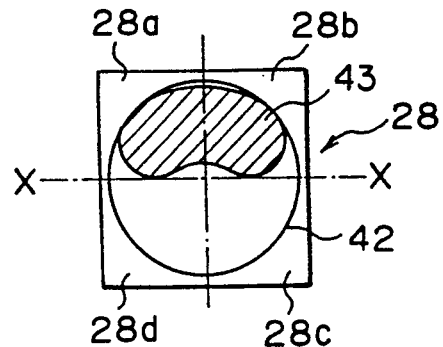
Figure 15:
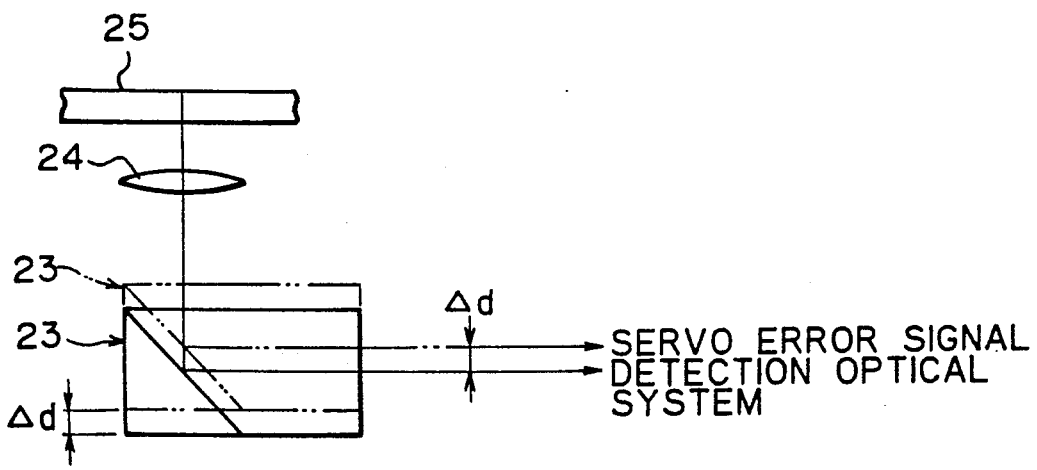
FIG. 15 shows a deviation of the optical axis of the rays of light propagating toward a servo error signal detection optical system from that of the normal rays of light when the position of a polarization beam splitter is shifted.
Figure 16:
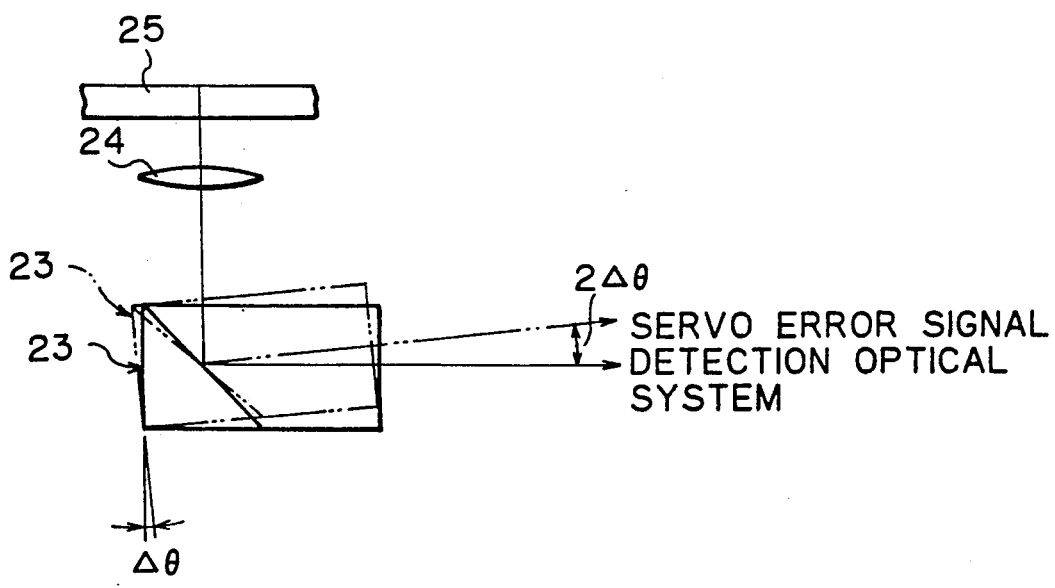
FIG. 16 shows a deviation of the optical axis of the rays of light propagating toward a servo error signal detection optical system separates from that of the normal rays of light when the angle of a polarization beam splitter is shifted.
Figure 17:
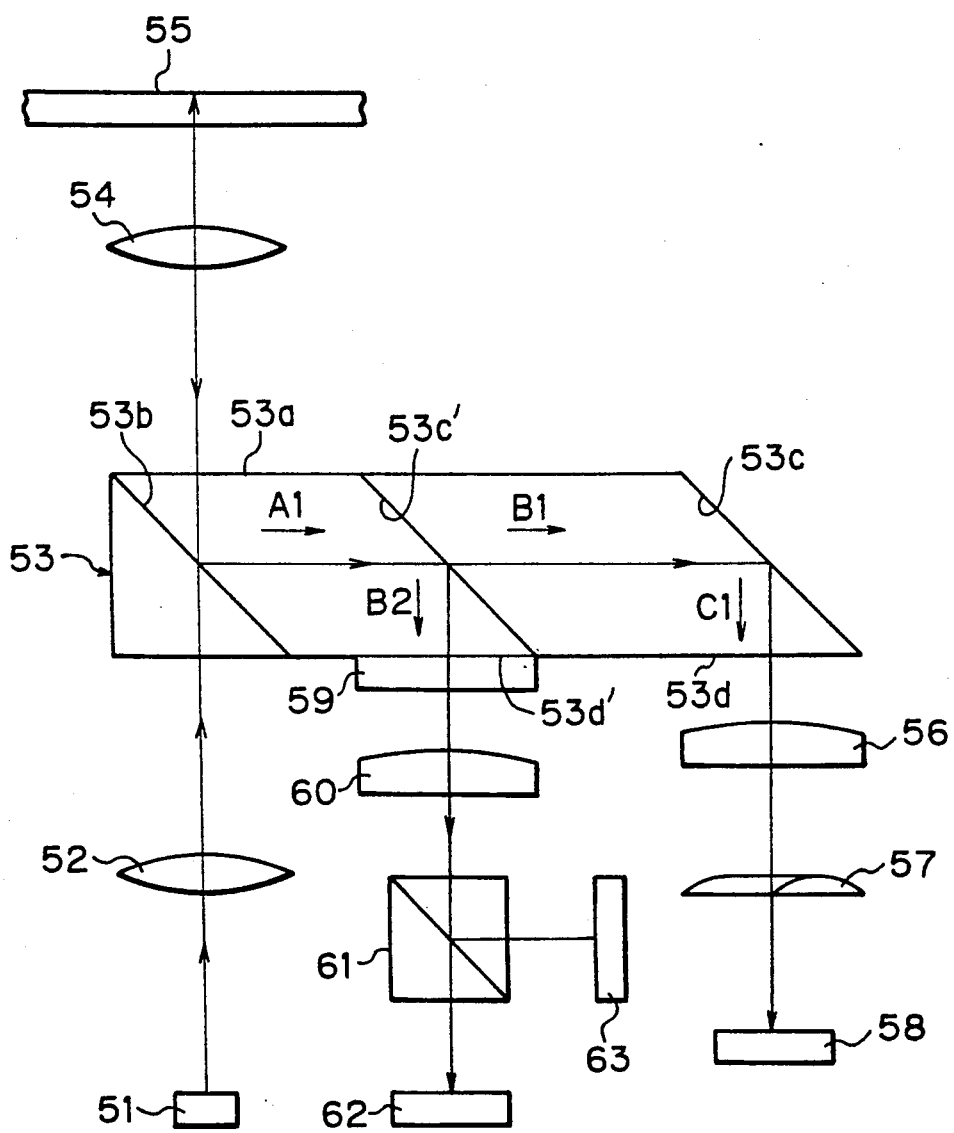
FIG. 17 is a schematic view of an optical head in accordance with a first embodiment of the present invention.

Referring at first to FIG. 17, linearly polarized rays of light which are emitted from a semiconductor laser 51 are converted into parallel rays of light by a collimator 52. The parallel rays of light pass through a polarization beam splitter (light split unit) 53 and is focused and irradiated by an objective 54 on a recording surface 55 of an optical magnetic recording medium in the form of a beam spot. When the rays of light are reflected by the recording surface 55 of the recording medium, they are modulate such that the plane of polarization thereof is rotated in a direction corresponding to the direction in which the area of the recording surface 55 irradiated by the beam spot is magnetized and become information light. This modulated information light passes through the objective 54 again and is then made incident of the polarization beam splitter 53 from an information light incident surface 53a thereof. The incident light is reflected by a first information light reflecting surface 53b and then propagates in a direction indicated by A1.

The rays of light which propagate in the direction indicated by A1 are split into two components by a splitting surface 53c', that is, the component directed in a direction indicated by B1 and the component directed in a direction indicated by B2. The rays of light which are directed in the direction indicated by B1 are reflected by a second information light reflecting surface 53c which is solely used to reflect light, and then propagate in a direction indicated by C1. The rays of light then emerge from the polarization beam splitter 53 through an information light emerging surface 53d, and reaches a servo error signal detection optical system which consists of a condenser 56, a cylindrical lens 57 and a photo detector 58. The servo error signal detection optical system detects a focusing error signal by the astigmatism method and a tracking error signal by the push-pull method from the rays of light which pass through it.

The polarization beam splitter 53 is arranged such that the first information light reflecting surface 53b is substantially parallel to the second information light reflecting surface 53c, and such that the angle between the information light incident surface 53a and the first information light reflecting surface 53b substantially coincides with the angle between the second information light reflecting surface 53c and the information light emerging surface 53d. Furthermore, the information light incident surface 53a, the first information light reflecting surface 53b, the second information light reflecting surface 53c and the information light emerging surface 53d are integrally formed in the beam splitter 53.

The rays of light which are directed in the direction indicated by B2 emerges from the polarization beam splitter 53 through a surface 53d', thereof, and is then demodulated by a read signal detection optical system which consists of a halfwave plate 59, a condenser 60, a polarization beam splitter (polarizer) 61, and a pair of photo detectors 62 and 63. The read signal detection optical system includes two photo detectors 62 and 63 so that the noises having the same phase can be cancelled by operating the differential output of these two photo detectors 62, 63 and a read signal having a high quality can thus be obtained.

In the optical head arranged in the manner described above, even when the position or angle of the polarization beam splitter 53 changes with a time due to the changes in the temperature or other various factors associated with the mounting precision of the polarization beam splitter 53, a shift in the optical axis of the rays of light propagating toward the servo error signal detection optical system can be minimized.

The principle of the minimization will be explained below with reference to FIGS. 18 and 19. The light having information obtained when the light is reflected by the recording surface 55 of the recording medium passes through the objective 54 and is then made incident on the polarization beam splitter 53 from the information light incident surface 53a. The incident light is first reflected by the first information light reflecting surface 53b and then by the second information light reflecting surface 53c, and leaves the polarization beam splitter 53 from the information light emerging surface 53d.

Figure 18:
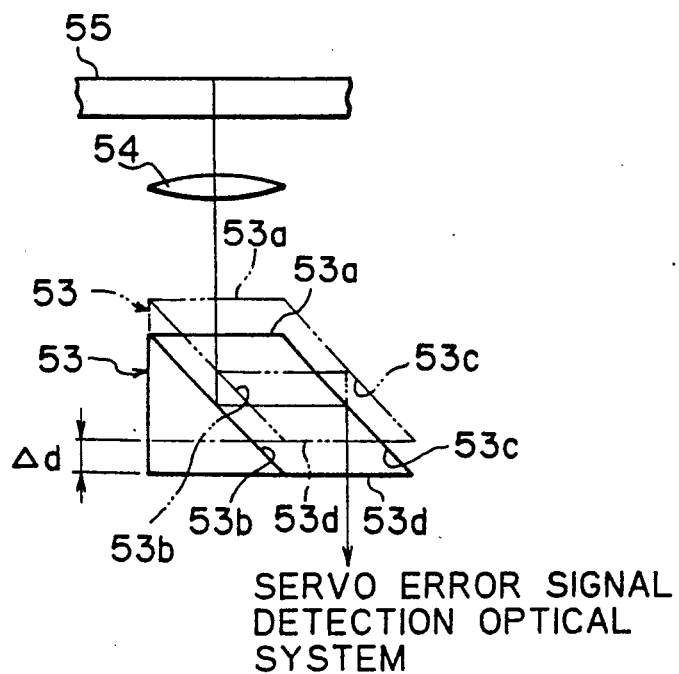
FIG. 18 shows a propagation of rays of light toward a servo error signal detection optical system along the optical axis of normal rays of light when the position of a polarization beam splitter is shifted.

Assuming that the polarization beam splitter 53 is deviated upward by a distance d and located at a position indicated by a virtual line, as shown in FIG. 18, the rays of light reflected by the first information light reflecting surface 53b deviate upward by the distance Δd, as shown by the virtual line. However, the rays of light reflected by the second information light reflecting surface 53c coincide with the optical axis of the normal rays of light indicated by the solid line and thus maintain the optical axis of the normal rays of light.

Figure 19:
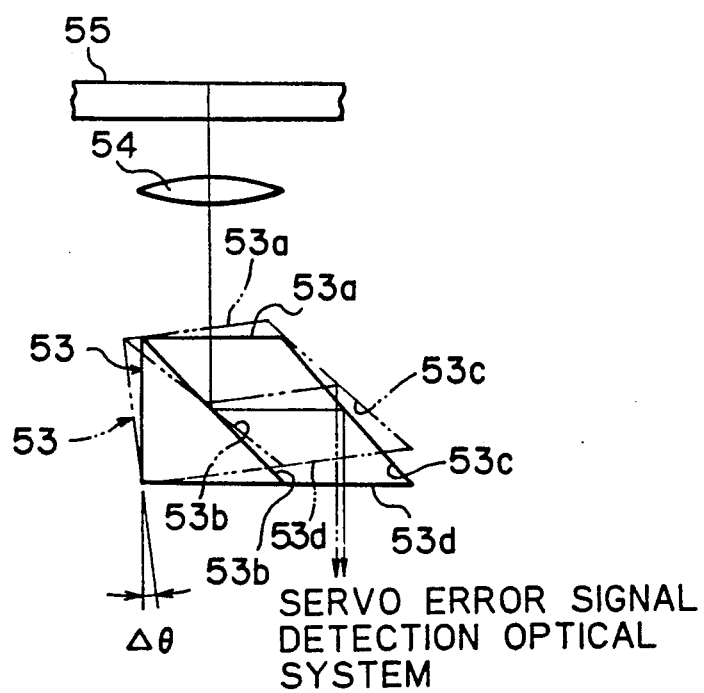
FIG. 19 shows a propagation of rays of light toward a servo error signal detection optical system without separating from the optical axis of normal rays of light when the angle of the polarization beam splitter is shifted.

Assuming that the polarization beam splitter 53 is inclined by an angle Δθ, as shown in FIG. 19, the rays of light reflected by the first information light reflecting surface 53b inclines by an angle 2Δθ relative to the optical axis of the normal rays of light indicated by the solid line and thereby separate from the optical axis of the normal rays of light. However, the rays of light reflected by the second information light reflecting surface 53c do not separate from the optical axis of the normal rays of light although offset occurs more or less.

In consequence, displacement of the optical axis of the rays of light directed toward the servo error signal detection optical system can be minimized.

Figure 20:
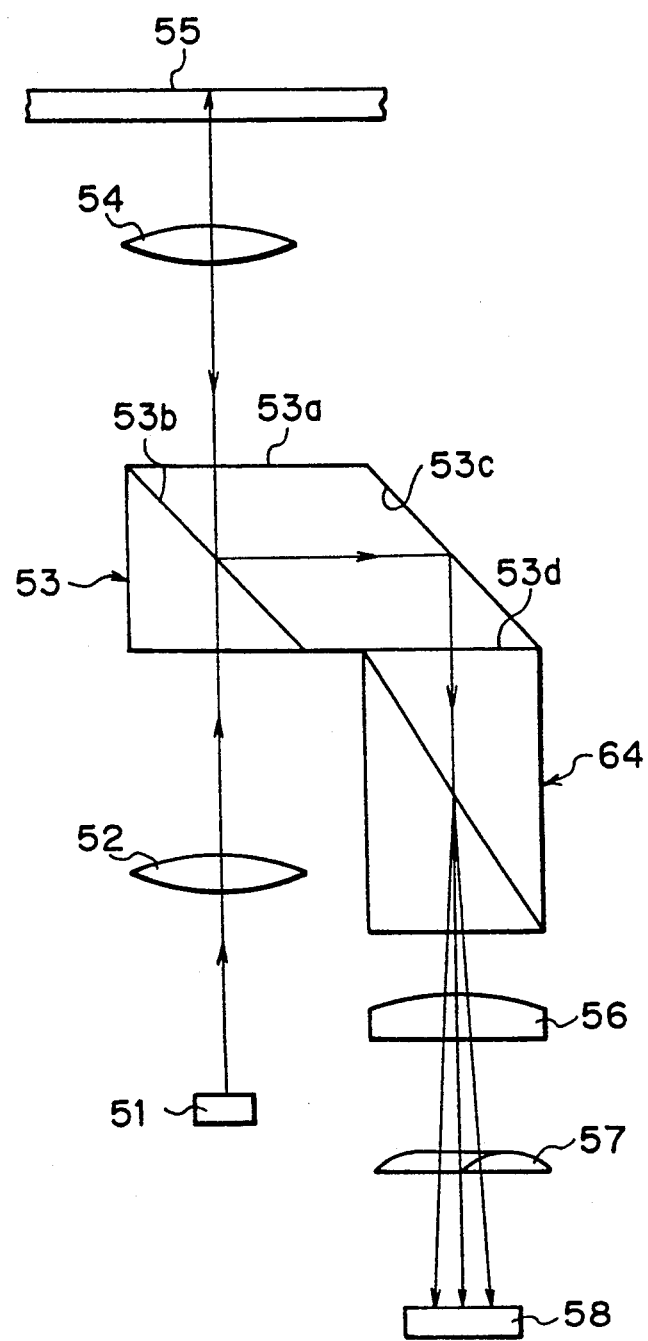
FIG. 20 shows a schematic view of an optical head in accordance with a second embodiment of the present invention, which employs a modified Wollaston prism.

A second embodiment of the present invention will be described below with reference to FIG. 20. The same reference numerals are used to denote parts which are the same as those in the first embodiment, description thereof being omitted. The second embodiment relates to an optical head which employs a modified Wollaston prism to split rays of light. The following two embodiments of the present invention will also employ the modified Wollaston prism.

The polarization beam splitter 53 is also arranged, like the one employed in the first embodiment, such that first information light reflecting surface 53b is substantially parallel to the second information light reflecting surface 53c, and such that the angle between the information light incident surface 53a and the first information light reflecting surface 53b substantially coincides with the angle between the second information light reflecting surface 53c and the information light emerging surface 53d. Furthermore, the information light incident surface 53a, the first information light reflecting surface 53b, the second information light reflecting surface 53c and the information light emerging surface 53d are integrally formed in the beam splitter 53. A modified Wollaston prism (analyzer) is integrally disposed on the information light emerging surface 53d of the polarization beam splitter 53.

The information light which emerges from the information light emerging surface 53d is made incident on the modified Wollaston prism 64, and is split into three components by the Wollaston prism 64, including the central beam whose intensity remains the same as that of the incident light and a left and a right beams, each of whose intensity is varied in accordance with the polarized state of the incident light. The photo detector 58 consists of six elements in which four parts correspond to the central beam while two elements correspond to the right and left beams respectively. The three beams emerged from the Wollaston prism 64 are transformed into rays of beam exhibiting astigmatism while they pass through the condenser 56 and the cylindrical lens 57. A servo error signal is detected from the output of the four elements corresponding to the central beam, and a read signal is detected by operating the differential output of the remaining two elements. Thus, in this type of optical head, the single optical system can be used as both the servo error signal detection optical system and the read signal detection optical system, and the photo detector can be constructed by one component which has the six elements.

In the second embodiment arranged in the manner described above, even when the position or angle of the polarization beam splitter 53 changes, a shift of the optical axis of the rays of light propagating toward the servo error signal detection optical system can be minimized due to the same principle as that shown in the first embodiment.

A third embodiment of the present invention will be described below with reference to FIGS. 21 and 22.

Figure 21:
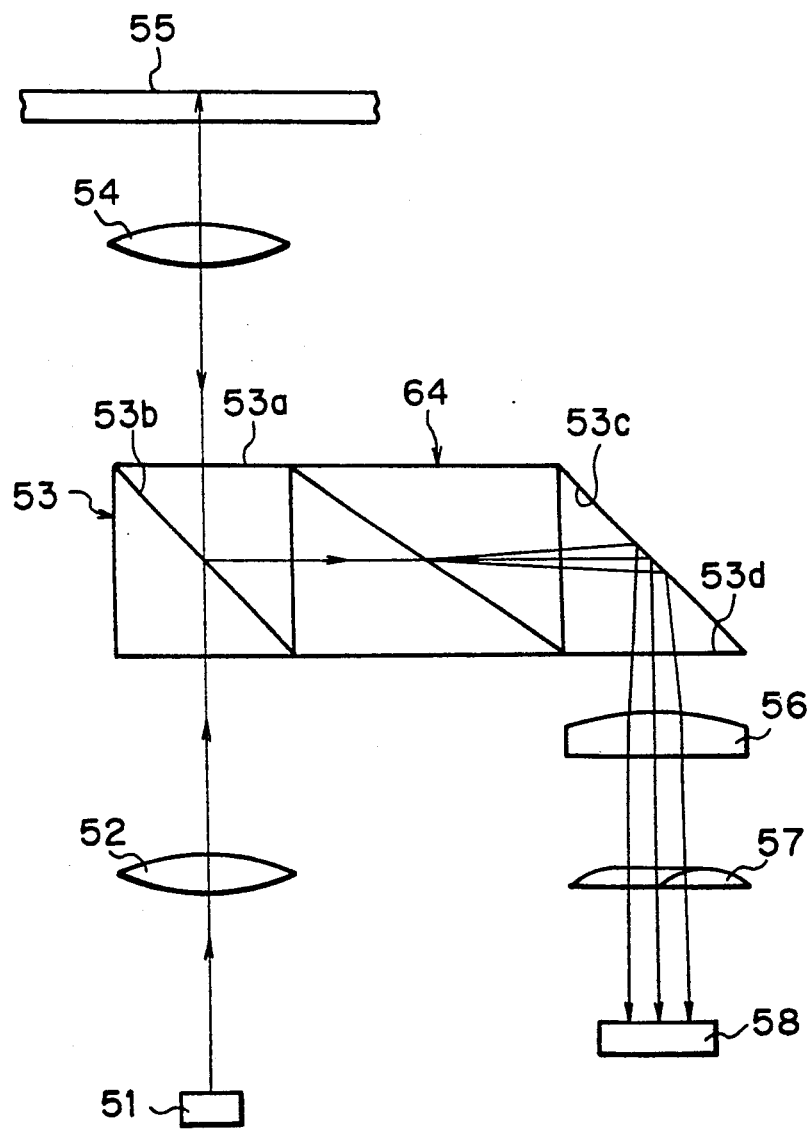
FIG. 21 shows a schematic view of an optical head in accordance with a third embodiment of the present invention, in which the modified Wollaston prism is disposed between a first information light reflecting surface and a second information light reflecting surface of the polarization beam splitter.
Figure 22:
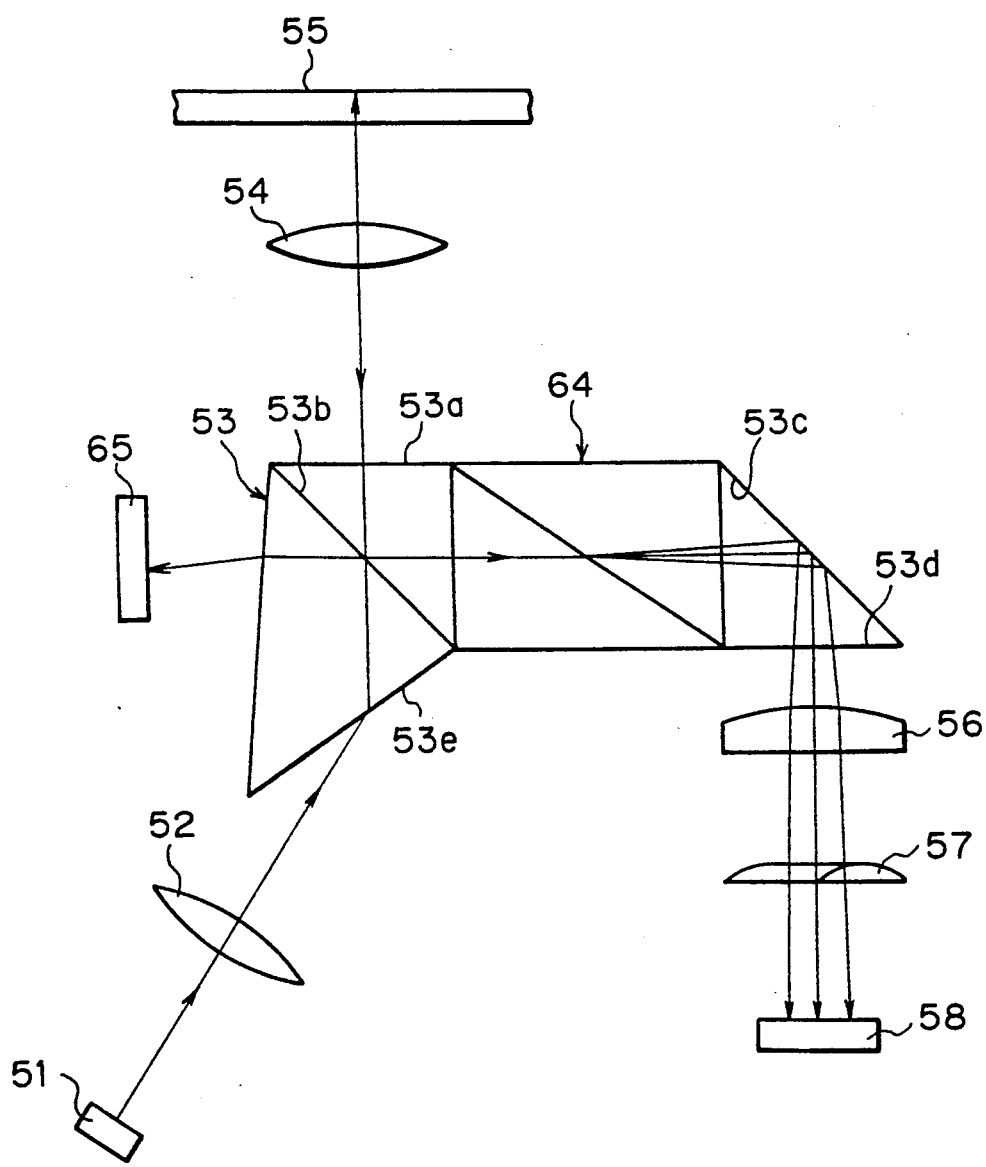
FIG. 22 shows a schematic view of an optical head in the third embodiment of the present invention with a modification, which employs a polarization beam splitter having a beam shaping surface.

In this embodiment, the modified Wollaston prism 64 is integrally disposed between the first information light reflecting surface 53b and the second information light reflecting surface 53c, as shown in FIGS. 21 and 22. Even though the polarization beam splitter 53 is divided by the modified Wollaston prism 64, it is arranged such that the first information light reflecting surface 53b is substantially parallel to the second information light reflecting surface 53c, and such that the angle between the information light incident surface 53a and the first information light reflecting surface 53b substantially coincides with the angle between the second information light reflecting surface 53c and the information light emerging surface 53d. Furthermore, the information light incident surface 53a, the first information light reflecting surface 53b, the second information light reflecting surface 53c and the information light emerging surface 53d are integrally formed in the beam splitter 53.

In the third embodiment arranged in the manner described above, even when the position or angle of the polarization beam splitter 53 changes, shift of the optical axis of the rays of light propagating toward the servo error signal detection optical system can be minimized due to the same principle as that shown in the first embodiment.

In the third embodiment, the modified Wollaston prism 64 does not project downward, unlike the one employed in the second embodiment. In consequence, the overall height of the optical head can be reduced.

An optical head shown in FIG. 22 differs from the one shown in FIG. 21 in that a beam incident surface 53e of the polarization beam splitter 53 has the function of shaping a beam of light. In this way, light utilizing efficiency and spot performance can be improved. A beam of light which is incident on the polarization beam splitter 53 from the beam incident surface 53e is partially reflected by the first information light reflecting surface 53b and then made incident on a photo detector 65 for a monitor. The photo detector 65 for the monitor controls the intensity of light emitted from the semiconductor laser 51.

Any of the above-described embodiments of the present invention has a configuration which is constructed on a plane. However, the present invention is also applicable to a separate type optical head in which an optical axis is deflected by 90° by a deflection mirror disposed below the objective 54 and in which the objective 54 and the deflection mirror are together moved in a radial direction of a disk (not shown).

Many widely different embodiments of the present invention may be constructed without departing from the spirit and scope of the present invention. It should be understood that the present invention is not limited to the specific embodiments described in this specification, except as defined in the appended claims.

What is claimed is:

1. An optical head for an optical disk recording/reproducing apparatus for irradiating a recording medium by a light beam emitted from a light source and introducing an information light which is formed by a light beam reflected from the recording medium to a photo detecting system, a shift of an optical axis of the information light being minimized, the optical head comprising:

means for receiving said information light which is reflected from said recording medium;
a first reflecting means for reflecting said information light received by said receiving means;
a second reflecting means for further reflecting said information light reflected by said first reflecting means and for directing said further reflected information light toward said photo detecting system;

means for emerging said information light reflected by said second reflecting means to said photo detecting system;

a beam incident means disposed adjacent to said first reflection means for shaping a beam of said light incident on a surface thereof, said receiving means, said first reflecting means, said second reflecting means, said emerging means, and said beam incident means constituting a light splitting means; and a modified Wollaston prism disposed between said first reflecting means and said second reflecting means for splitting said information light reflected from said first reflecting means.

2. An optical head according to claim 1, wherein said first reflecting means has a surface for reflecting said information light thereby, and said second reflecting means also has a surface for reflecting said reflected information light from said surface of said first reflecting means, said surface of said first reflecting means being substantially parallel to said surface of said second reflecting means.

3. An optical head according to claim 1, wherein said emerging means has a surface for emerging said information light reflected by said surface of said second reflecting means, and an angle between said surface of said receiving means and said surface of said first reflecting means being substantially equal to an angle between said surface of said second reflecting means and said surface of said emerging means.

4. An optical head according to claim 1, wherein said optical head further includes a photo detector for monitoring an intensity of said light emitted from said light source and incident on said beam incident means.

5. An optical head according to claim 1, wherein said photo detecting system consists of a condense lens, a cylindrical lens, and a photo detector in series for detecting a focusing error signal by an astigmatism method and a tracking error signal by a push-pull method from a light passing therethrough.

6. An optical head according to claim 1, wherein said light reflected from said recording medium is polarized thereby.

7. An optical head according to claim 1, wherein said light splitting means is a polarization beam splitter.

8. An optical head according to claim 1, wherein said information light is so formed that a plane of polarization thereof is rotated in a direction corresponding to a direction in which an area of a surface of said recording medium irradiated by a spot of said light beam is magnetized.

* * * * *